W. N. YOUNGLOVE.
TRANSMISSION MECHANISM.
APPLICATION FILED APR. 13, 1915.
1,164,444.
Patented Dec. 14, 1915.
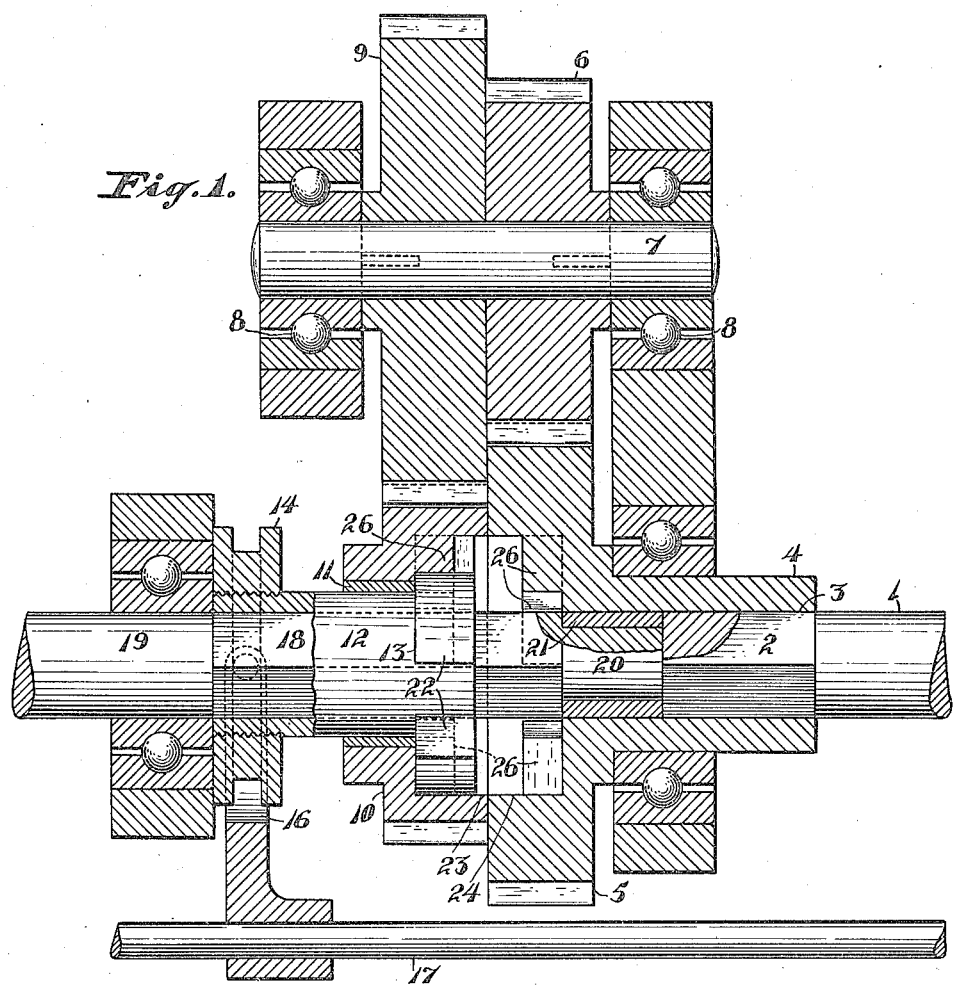
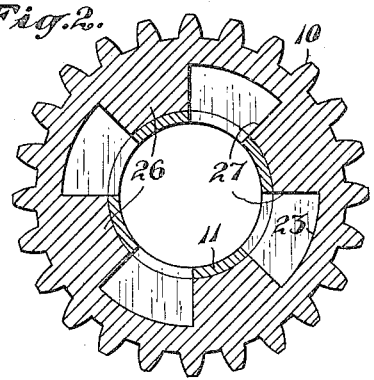
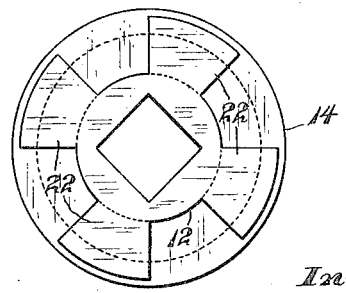
Inventor,
W. N. Younglove,
By F. M. Wright
Attorney

UNITED STATES PATENT OFFICE.

WILBUR N. YOUNGLOVE, OF RICHMOND, CALIFORNIA.

TRANSMISSION MECHANISM.

1,164,444. Specification of Letters Patent. Patented Dec. 14, 1915.

Application filed April 13, 1915. Serial No. 21,129.

*To all whom it may concern:*

Be it known that I, WILBUR N. YOUNGLOVE, a citizen of the United States, residing at Richmond, in the county of Contra Costa and State of California, have invented certain new and useful Improvements in Transmission Mechanism, of which the following is a specification.

The present invention relates to improvements in transmission mechanism for automobiles, motor-cycles or any other machinery which is capable of operation at two different speeds, and the object of the invention is to provide mechanism for this purpose which will be extremely simple in construction and effective in operation.

In the accompanying drawing, Figure 1 is a broken side view of my improved transmission mechanism in its neutral or inoperative position; Fig. 2 is a transverse section of a driven gear wheel and a bushing therefor detached; Fig. 3 is an end view of a sleeve and a yoke collar screwed thereon detached.

Referring to the drawing, 1 indicates a drive shaft having a square working end 2 which engages a square portion of a central hole 3 in an extension 4 of a driving gear wheel 5 which meshes with a gear wheel 6 keyed on a shaft 7 mounted in suitable bearings 8, on which shaft is also keyed a gear wheel 9 which meshes with a driven gear wheel 10 in the hub of which is a bushing 11 through which extends a sleeve 12 carrying a spider 13, a yoke collar 14 being screwed, as shown at 15, upon said sleeve, said yoke collar being operated by a yoke 16 slidable upon a control rod 17. Said sleeve 12 is formed with a square hole to slide upon a square portion 18 of a driven shaft 19, said drive shaft having a reduced cylindrical terminal portion 20 rotating in a bushing 21 in the hole 3 through the driving gear wheel 5 and the extension thereof. Said spider is formed with four equidistant lugs 22, which, as the extension 12 slides upon the driven shaft 19, move in a cavity formed by oppositely directed adjacent recesses 23, 24 respectively formed in the gear wheels 10 and 5, the width of the lugs of said spider being slightly less than the width of each of the recesses in said gear wheels. Projecting from the cylindrical wall of each recess close to the bottom thereof and having a height from said bottom of a little more than half the depth of the recess are lugs 26, corresponding in number with the lugs of the spider and forming recesses 27 which the lugs of the spider can engage. In the outer parts of the recesses 23, 24 the lugs of the spider can rotate freely without engaging said gear wheels.

The operation of the device will be obvious from the foregoing description.

If the spider is moved to the central portion of the cavity formed by the two recesses 23 and 24 in the gear wheels, the driving gear wheel 5 can then rotate without imparting motion to the spider 13 or to the driven shaft 19. This is therefore the neutral position of the transmission mechanism. If the spider is moved to the right, so that the lugs 22 thereof enter the recesses 27 of the driving gear wheel 5, then the driving gear wheel, which rotates with the drive shaft 1, imparts rotation to the driven shaft 19, which therefore rotates at the same speed as the drive shaft, in the case illustrated at a lower speed. If, on the other hand, the spider is moved to the left, so that its lugs 22 engage the recesses 27 in the driven gear wheel 10, then the driven gear wheel 10, which rotates with the driving gear wheel 5, but is of larger diameter, imparts rotation to the driven shaft 19 at a higher speed than that of the drive shaft.

I claim:—

1. In transmission mechanism of the class described, the combination, with a driving shaft and a driven shaft, of gear wheels around the respective shafts having oppositely directed adjacent recesses, a sleeve slidable on and rotating with one of said shafts, the other shaft being rotatable with the gear wheel therearound, said gear wheels having lugs integral therewith in the bottoms of said recesses, and means for sliding said sleeve on said shaft, the outer portions of said recesses being free from obstructions, said sleeve having a lug in the cavity formed by said recesses, adapted, in the different positions of the sleeve, to engage a lug of either gear wheel or to be free of engagement therewith, and gear wheels rotating in unison and meshing respectively with the aforesaid gear wheels.

2. In transmission mechanism of the class described, the combination of a driving shaft, a gear wheel rotating therewith, a driven shaft axially in line with the driving shaft, a gear wheel rotatable around said driven shaft, said gear wheels being of unequal diameters and having oppositely directed adjacent recesses therein, a sleeve slidable on, but rotating with, the driven shaft and having a projection in the cavity formed by said recesses, projections, integral with the respective gear wheels, in the ends of the cavity formed by said recesses, which the projection on the sleeve respectively engages, the central part of said cavity being free from projections, whereby said projection from the sleeve may be free of the projections on the gears, operatively connected gear wheels of unequal diameter respectively meshing with the aforesaid gear wheels, and means for sliding said sleeve upon said shaft.

WILBUR N. YOUNGLOVE.

Witnesses:
F. H. WELSH,
JAS. J. KELEHER.

Copies of this patent may be obtained for five cents each, by addressing the "Commissioner of Patents, Washington, D. C."